(12) United States Patent
Agiwal et al.

(10) Patent No.: US 8,750,332 B2
(45) Date of Patent: Jun. 10, 2014

(54) METHOD AND SYSTEM FOR ENCODING AND DECODING MEDIUM ACCESS CONTROL LAYER PACKET

(75) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 12/830,721

(22) Filed: Jul. 6, 2010

(65) Prior Publication Data

US 2011/0002347 A1 Jan. 6, 2011

(30) Foreign Application Priority Data

Jul. 6, 2009 (IN) .......................... 1598/CHE/2009
May 24, 2010 (IN) .......................... 1598/CHE/2009

(51) Int. Cl.
 *H04J 3/24* (2006.01)
 *H04L 29/06* (2006.01)
(52) U.S. Cl.
 CPC ................... *H04L 29/0653* (2013.01)
 USPC ........................................................ 370/474
(58) Field of Classification Search
 CPC ................................................. H04L 29/0653
 USPC ......................................................... 370/474
 See application file for complete search history.

(56) References Cited

U.S. PATENT DOCUMENTS

| 5,416,779 A * | 5/1995 | Barnes et al. ................. 370/280 |
| 5,612,956 A * | 3/1997 | Walker et al. ................. 370/545 |
| 6,590,882 B1 | 7/2003 | Fong et al. |
| 6,683,866 B1 * | 1/2004 | Stanwood et al. ............. 370/350 |
| 2005/0259623 A1 * | 11/2005 | Garudadri et al. ............ 370/335 |
| 2006/0140158 A1 * | 6/2006 | Terry .............................. 370/335 |
| 2006/0153126 A1 * | 7/2006 | Jung et al. ..................... 370/328 |
| 2007/0110103 A1 * | 5/2007 | Zimmerman et al. ........ 370/474 |

(Continued)

FOREIGN PATENT DOCUMENTS

| JP | 2001-160814 A | 6/2001 |
| JP | 2003-513592 A | 4/2003 |
| JP | 2007-509531 A | 4/2007 |
| JP | 2009-071805 A | 4/2009 |

OTHER PUBLICATIONS

Lee et al; Proposed Text Related to MAC PDU formats for the IEEE 802.16m Amendment; Apr. 27, 2009; IEEE.*

(Continued)

*Primary Examiner* — Mark Rinehart
*Assistant Examiner* — Christopher R Crompton
(74) *Attorney, Agent, or Firm* — Jefferson IP Law, LLP

(57) ABSTRACT

A method and system for encoding and decoding Medium Access Control (MAC) Protocol Data Units (PDUs) in a MAC layer packet is provided. The method includes receiving a request from a Physical (PHY) layer to transmit the MAC layer packet, wherein the MAC layer packet is transmitted in a predefined number of bytes that is determined in the PHY layer, and filling unfilled portion in the MAC layer packet with at least one fixed pattern in a predefined pattern set when a number of bytes that are unfilled is equal to or greater than 1. The unfilled portion includes total number of bytes that are unfilled in the MAC layer packet. Thereafter, the unfilled portion of the MAC layer packet is filled with a predefined pattern set when the number of predefined bytes is greater than the cumulative size of the available MAC PDUs arranged in the MAC layer packet.

28 Claims, 11 Drawing Sheets

(56) References Cited

U.S. PATENT DOCUMENTS

| | | | |
|---|---|---|---|
| 2009/0073984 A1* | 3/2009 | Jackson | 370/394 |
| 2009/0087430 A1 | 4/2009 | Kurt-Jones et al. | |
| 2010/0146351 A1* | 6/2010 | Kakani et al. | 714/746 |
| 2012/0063381 A1* | 3/2012 | Huang et al. | 370/312 |

OTHER PUBLICATIONS

Anil Agiwal, Youngbin Chang, Sungjin Lee, Rakesh Taori, Jungje Son: "Proposed Text on Construction & Transmission of MAC PDU section for AWD", IEEE 802.16 Broadband Wireless Access Working Group <http://ieee802.org/16>, Apr. 27, 2009, XP002611638, Retrieved from Internet: URL:http://www.ieee802.org/16/tgm/contrib/C80216m-09_0981.doc [retrieved on Nov. 26, 2010], sections 15.2.x, 15.2.x.2, and 15.2.x.6.

Zhifeng Tao et al: "MAC 25-4-Performance Improvement for Multichannel HARQ Protocol in Next Generation WiMAX System", Wireless Communications and Networking Conference, 2008. WCNC 2008. IEEE, IEEE, Piscataway, NJ, USA, Mar. 31, 2008, pp. 2009-2014, XP031243942, ISBN: 978-1-4244-1997-5 2nd and 3rd paragraphs of Section II.A.Figure 1.

IEEE: "P802.16m/D6, May 2010 IEEE Draft Amendment Standard for Local and Metropolitan Area Networks—Part 16: Air Interface for Fixed and Mobile Broadband Wireless Access Systems—Advanced Air Interface", IEEE, May 22, 2010, XP002611647, Retrieved from Internet: URL:URL:http://www.ieeexplore.ieee.org/servlet/opac?pumber=5510224 [retrieved on Nov. 26, 2010], sections 16.2.4, 16.2.4.3, and 15.2.4.7.

Anil Agiwal, Youngbin Chang, Sungjin Lee, Rakesh Taori, Jungje Son: "Proposed Text on Construction & Transmission of MAC PDU section for AWD ( AWD-section 15.2. x)", IEEE 802.16 Broadband Wireless Access Working Group <http://ieee802.org/16>, Jul. 6, 2009, XP002611653, Retrieved from Internet: URL:http://www.ieee802.org/16/tgm/contrib/C80216m-09_1271.doc [retrieved on Nov. 26, 2010], sections 15.2.x, 15.2.x.2, and 15.2.x.6.

"Concatenated MAC-hs PDU", 3GPP Draft; R2-061211 Concatenated MAC-HS (3GPP), Mobile Competence Centre; 650, Sophia Antipolis Cedex; France, vol. RAN WG2, no. Shanghai, China; May 3, 2006. XP050131158.

* cited by examiner

METHOD AND SYSTEM FOR ENCODING AND DECODING MEDIUM ACCESS CONTROL LAYER PACKET

PRIORITY

This application claims the benefit under 35 U.S.C. §119(a) of an Indian patent application filed in the Indian Intellectual Property Office on Jul. 6, 2009 and assigned Serial No. 1598/CHE/2009 Provisional Specification (PS) and an Indian patent application filed in the Indian Intellectual Property Office on May 24, 2010 and assigned Serial No. 1598/CHE/2009 Complete Specification (CS), the entire disclosures of each of which are hereby incorporated by reference.

BACKGROUND OF THE INVENTION

1. Field of the Invention

The present invention relates to wireless communication system protocols. More particularly the present invention relates to encoding and decoding a Medium Access Control (MAC) layer packet.

2. Description of the Related Art

Broadband wireless networks are based on various communication standards, for example, the Institute of Electrical and Electronics Engineers (IEEE) 802.16e based Worldwide Interoperability for Microwave Access (WiMAX) standard, and its evolution to IEEE 802.16m, provides various types of services such as voice, packet data exchange, and the like. In such a network, user data and control information is exchanged between a Mobile Station (MS) and a Base Station (BS) by establishing a connection. The control information is generated by various protocols running at the MS and the BS. The data packets are generated by various applications at the MS and BS. Typically, wireless communication standards beyond $3^{rd}$ Generation (3G), for example 3G Partnership Project (3GPP) Long Term Evolution (LTE), IEEE 802.20, and IEEE 802.16e-2005, mobile WiMAX, and the like, use Protocol Data Units (PDUs) to carry the control and data information.

The IEEE 802.16m communication standard is associated with a protocol architecture that includes PHYsical (PHY) layer and Medium Access Control (MAC) layer specifications. The MAC layer comprises three sub-layers which are the specific Convergence Sub-layer (CS), the MAC Common Part Sub-layer (MAC CPS), and the security sub-layer. The CS provides transformation and/or mapping of external network data, received through the CS Service Access Point (SAP), into MAC Service Data Units (SDUs) received by the MAC CPS through the MAC SAP. This includes classifying external network SDUs and associating the external network SDUs to an appropriate MAC connection. It may also include other functions such as Payload Header Suppression (PHS).

The MAC CPS receives data from the various CSs, through the MAC SAP, classified to particular MAC connections. Data is transferred between the MAC CPS and the PHY layer via the PHY SAP. The MAC CPS also contains a separate security sub-layer that provides authentication, secure key exchange, and encryption. The MAC CPS forms an IEEE 802.16m based MAC PDU. The MAC PDU format includes a Generic MAC Header (GMH), an Extended Header (EH), and payload. Each connection payload includes one or more MAC SDUs or MAC SDU fragments received from the CS layer for the particular connection.

Further, the GMH format (based on the IEEE 802.16m standard) includes a Flow Identifier (Flow ID) field, an Extended Header (EH) field, and a Length field. A connection is identified by the Flow ID field. The EH field indicates whether an extended header is present in the MAC PDU or not. Further, the Length field gives information about the MAC PDU payload. The EH field includes a subfield to identify the type of specific contents. The EH field contains a type field and a body contents field. The type field indicates the type of extended header and the body contents field indicates the type-dependent contents.

The MAC PDU format includes a fixed size GMH, an optional EH, and payload. Thus, during communication each application will be associated with one connection. Hence, the connection information will be stored in the MAC PDU. The MAC layer encodes multiple MAC PDUs (MPDUs) to form a MAC layer packet, which is sent to a PHY layer for transmitting through the air. The size (in bytes) of a MAC layer packet formed by a MAC Layer is equal to a number of bytes requested by the PHY layer from the MAC layer. Thereafter, the multiple MAC PDUs that are encoded in the MAC layer packet are sent from the PHY layer of a transmitting communication device to a PHY layer of a receiving communication device. Thereafter, the MAC layer packet is decoded in another communication device.

However, there may be a scenario where the MAC layer may not have enough information bytes to form a MAC layer packet of a size that is requested by the PHY layer. In such a scenario, the MAC layer packet is formed by encoding multiple PDUs that are available from various connections followed by unfilled empty bytes. Thus, when the receiving communication device receives the MAC layer packet, it decodes the GMH and determines the end of MAC PDU. The receiving communication device continues this process until it reaches the end of MAC layer packet. Hence, the receiving communication device tries to decode the GMH after the last MAC PDU in the MAC layer packet even if the MAC layer packet had an unfilled portion following the last MAC PDU. This is because the end of the MAC PDU information in the MAC layer packet is not indicated. This results in incorrect decoding of the MAC layer packet at the receiving device and thereby reduces efficiency of the system.

Hence there exists a need to efficiently encode and decode MAC PDUs in the MAC layer packet.

SUMMARY OF THE INVENTION

An aspect of the present invention is to address at least the above-mentioned problems and/or disadvantages and to provide at least the advantages described below. Accordingly, an aspect of the present invention is to provide a system and method for encoding and decoding Medium Access Control (MAC) Protocol Data Units (PDUs) in a MAC layer packet.

In accordance with an aspect of the present invention, a method for encoding MAC PDUs in a MAC layer packet is provided. The method includes receiving a request from a Physical (PHY) layer to send a MAC layer packet in a predefined number of bytes. The predefined number of bytes is identified in the PHY layer. The method then arranges available MAC PDUs in the MAC layer packet. Further, a number of bytes that are unfilled in the MAC layer packet is determined after arranging the available MAC PDUs in the MAC layer packet. The unfilled bytes are identified based on a cumulative size of the available MAC PDUs arranged in the MAC layer packet and the predefined number of bytes that is associated with the MAC layer packet. Further, the unfilled bytes are filled in the MAC layer packet with a predefined pattern.

In accordance with another aspect of the present invention, a method for decoding MAC layer packet is provided. The method includes receiving a MAC layer packet from a PHY layer. The method then determines at least one of available MAC PDUs and/or an unfilled portion in the MAC layer packet based on a value in a first byte and values in a set of second bytes when the predefined number of bytes is greater than one byte. The first byte is associated with a first fixed pattern from a predefined pattern set and the set of second bytes is associated with a second fixed pattern from the predefined pattern set. The predefined number of bytes is one or more bytes that are remaining for decoding in the MAC layer packet. Further, the method determines at least one of the available MAC PDU and/or the unfilled portion in the MAC layer packet based on the first byte when the predefined number of bytes is smaller than two bytes.

In accordance with yet another aspect of the present invention, a communication device is provided. The communication device includes a processor and a transceiver. The transceiver transmits information associated with available MAC PDUs in the MAC layer packet. The transceiver is also capable of receiving information associated with the available MAC PDUs in the MAC layer packet. The processor is capable of encoding the available MAC PDUs in the MAC layer packet. Further, the processor encodes the unfilled portion in the MAC layer packet using a plurality of fixed patterns. The processor also decodes MAC PDUs information from predefined byte information. The processor then determines bytes that are unfilled in the MAC layer packet information based on a first byte and a set of second bytes. Thereafter, the processor discards the unfilled portion in the MAC layer packet while decoding the MAC layer packet.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 10, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
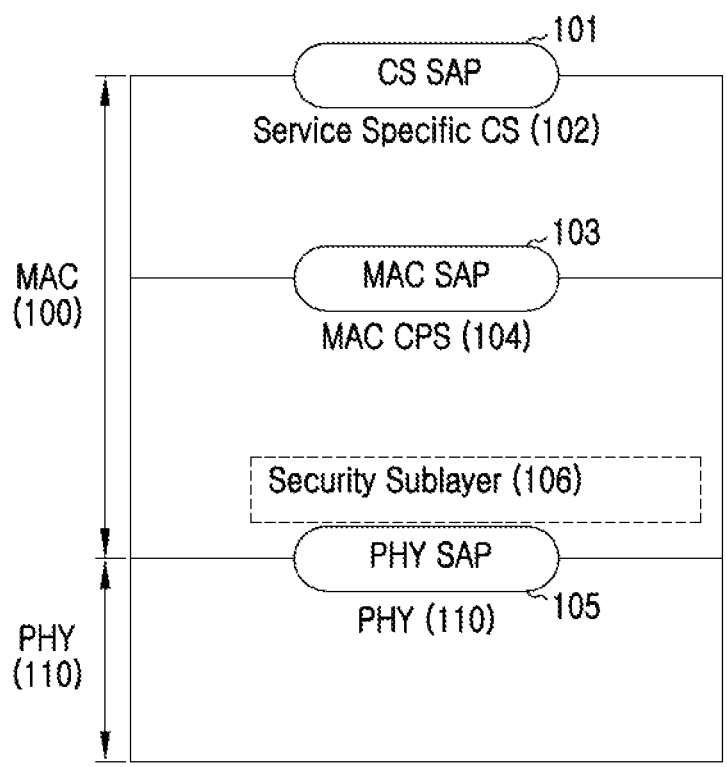
FIG. 1 illustrates an Institute of Electrical and Electronics Engineers (IEEE) 802.16m protocol architecture according to an exemplary embodiment of the present invention.

FIG. 1 illustrates an Institute of Electrical and Electronics Engineers (IEEE) 802.16m protocol architecture according to an exemplary embodiment of the present invention.

Referring to FIG. 1, the IEEE 802.16m protocol architecture defines the Physical (PHY) layer 110 and Medium Access Control (MAC) layer 100 specifications. The MAC layer 100 includes three sub-layers, including a service specific Convergence Sub-layer (CS) 102, a MAC Common Part Sub-layer (MAC CPS) 104 and a security sub-layer 106.

The CS 102 provides transformation or mapping of external network data, received through a CS Service Access Point (SAP) 101, into MAC Service Data Units (SDUs) received by the MAC CPS 104 through a MAC SAP 103. This includes classifying external network SDUs and associating external network SDUs with the proper MAC connection. This also includes other functions such as Payload Header Suppression (PHS).

The MAC CPS 104 receives data from the various CSs, through the MAC SAP 103, associated with specific types of MAC connections. Data is transferred between the MAC CPS 104 and the PHY layer 110 via the PHY SAP 105. The MAC CPS 104 also contains a separate security sub-layer 106 providing authentication, secure key exchange, and encryption. The connection information and data will be stored in multiple MAC PDUs. The MAC layer 100 encodes the available MAC PDUs (MPDUs) to form a MAC layer packet, which is then sent to a PHY layer 110 for further transmission. The size (in bytes) of the MAC layer packet formed by MAC layer 100 is equal to a number of bytes requested by the PHY layer 110 from the MAC layer 110.

Figure 2A:
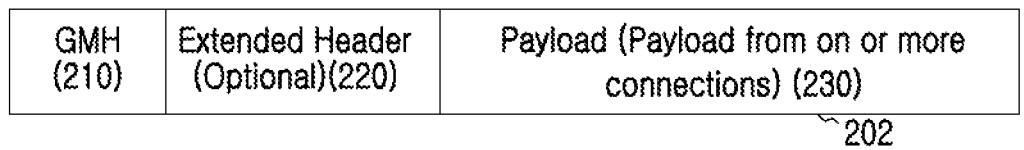
FIGS. 2A to 2C illustrate Institute of Electrical and Electronics Engineers (IEEE) 802.16m Medium Access Control (MAC) layer packets according to the related art.
Figure 2B:
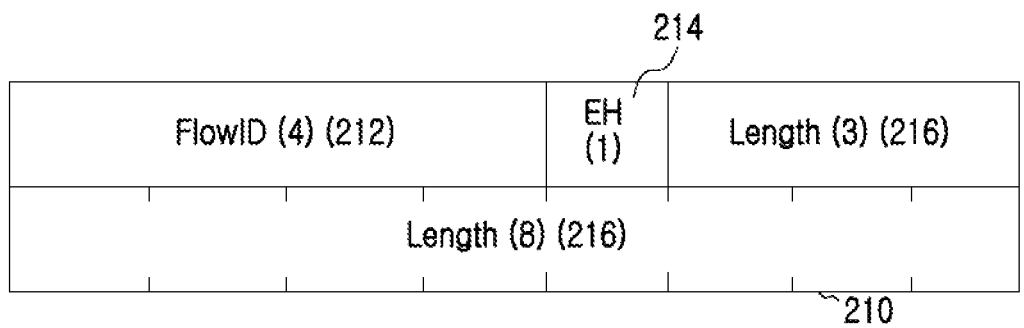
Figure 2C:
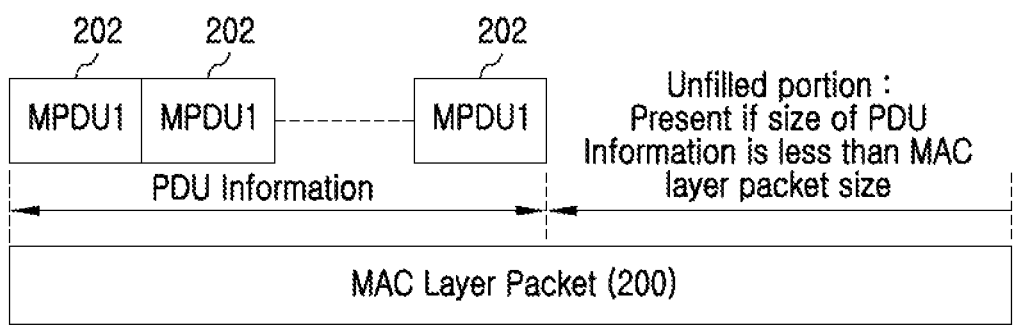

FIGS. 2A to 2C illustrate IEEE 802.16m MAC layer packets according to the related art.

Referring to FIG. 2A, available MAC PDUs 202 are encoded in a MAC layer packet 200 and are transmitted from one PHY layer to another PHY layer. The MAC common part sub-layer forms MAC PDUs. An IEEE 802.16m based MAC PDU 202 is depicted. The MAC PDU 202 includes a Generic MAC Header (GMH) 210, an optional Extended Header (EH) 220, and payload 230. The payload includes payloads from one or more connections. Each connection payload includes one or more MAC SDU or MAC SDU fragments received from a CS layer for that connection.

Referring to FIG. 2B, the GMH 210 includes a Flow Identifier (Flow ID) field 212 with which a connection is identified. The GMH 210 also includes an EH field 214 to indicate whether an EH is present in the MAC PDU 210. The GMH 210 further includes a length field 216 to identify payload length of the MAC PDU. The available MAC PDUs 202 are arranged in the MAC layer packet 200 and are transmitted from the MAC layer to the PHY layer to be transmitted further.

Referring to FIG. 2C, the size of the MAC layer packet 200 is decided by the PHY layer. The available MAC PDUs 202 are arranged in the MAC layer packet 20 as shown in FIG. 2C. The MAC layer packet contains one or more MAC PDUs 202. Further, if the size of the MAC layer packet 200 is greater than the cumulative size of the one or more MAC PDUs 202, then the number of bytes that are unfilled in the MAC layer packet 200 are left blank.

Figure 3:
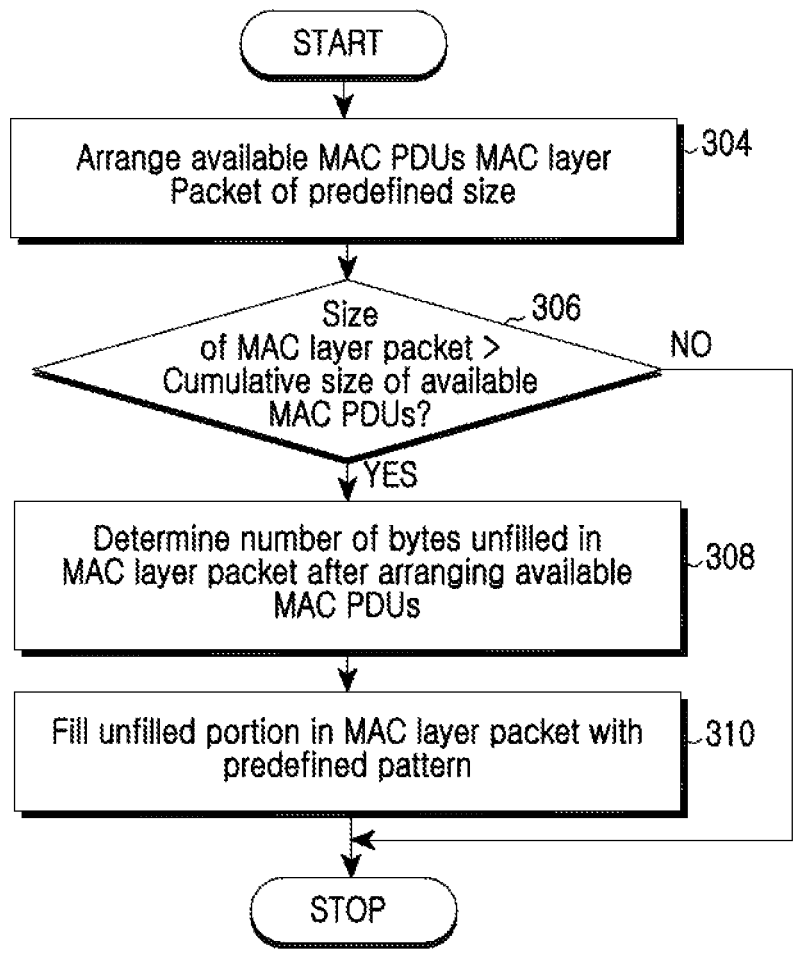
FIG. 3 illustrates a flow diagram for encoding a MAC layer packet according to an exemplary embodiment of the present invention.

FIG. 3 illustrates a flow diagram for encoding a MAC layer packet according to an exemplary embodiment of the present invention.

Referring to FIG. 3, at step 304, available MAC PDUs are arranged in a MAC layer packet of a predefined size. In an exemplary embodiment, the size of the MAC layer packet is decided by the PHY layer. The MAC layer packet is formed in the MAC layer when a request is received from the PHY layer to send a predefined number of bytes of information. Herein, the available MAC PDUs denote 0 or at least one MAC PDU to be transmitted through the MAC layer packet. In an exemplary embodiment, the available MAC PDUs are zero or more MAC PDUs that are available for encoding in the MAC layer. Namely, in a case where the available MAC PDUs include no MAC PDU, the MAC PDU is comprised of at least one fixed pattern. When the available MAC PDUs include no MAC PDU, step 304 may be omitted. After the available MAC PDUs are arranged in the MAC layer packet, the predefined size of the MAC layer packet is compared with cumulative size of the arranged MAC PDUs in the MAC layer packet in step 306. More specifically, it is determined if the predefined size of the MAC layer packet is greater than the cumulative size of the arranged MAC PDUs. If it is determined that the predefined size of the MAC layer packet is not greater than the cumulative size of the arranged MAC PDUs, the process is terminated. In contrast, if it is determined that the predefined size of the MAC layer packet is greater than the cumulative size of the arranged MAC PDUs, the process proceeds to step 308.

In step 308, the number of bytes that are unfilled in the MAC layer packet after arranging the available MAC PDUs in the MAC layer packet are determined. In an exemplary embodiment, the number of bytes that are unfilled is determined by subtracting the cumulative size of the available MAC PDUs arranged in the MAC layer packet with the predefined number of bytes that is associated with the MAC layer packet. Namely, a size of the unfiled portion may be equal to or less than a size of the MAC layer packet. In step 310 the unfilled bytes in the MAC layer packet are filled with a predefined pattern. Thereafter, the process is terminated.

Figure 4:
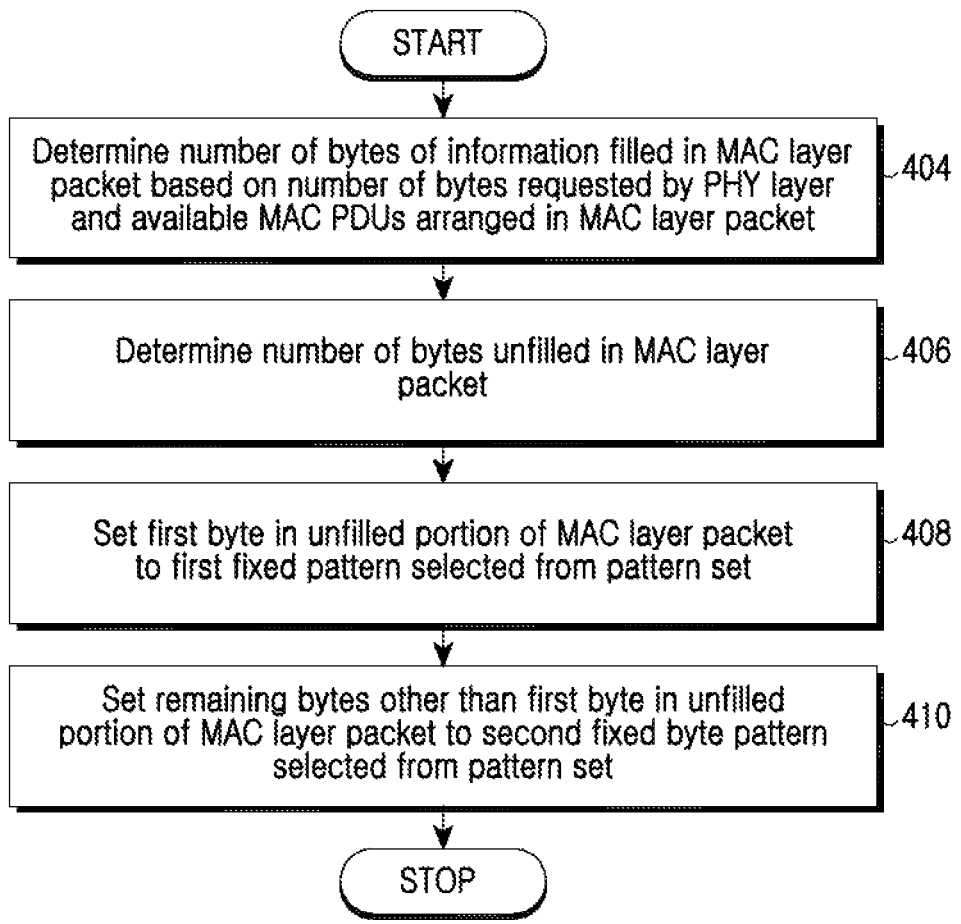
FIG. 4 illustrates a flow diagram for encoding a MAC layer packet according to an exemplary embodiment of the present invention.

FIG. 4 illustrates a flow diagram for encoding a MAC layer packet according to an exemplary embodiment of the present invention.

Referring to FIG. 4, in step 404, a number of bytes of information filled in the MAC layer packet is determined based on number of bytes requested by the PHY layer and available MAC PDUs arranged in the MAC layer packet. In step 406, a number of bytes that are unfilled in the MAC layer packet are determined. In an exemplary embodiment, an unfilled portion in the MAC layer packet is determined after arranging the available MAC PDUs in the MAC layer packet. For example, the number of bytes in the unfilled portion may be determined by subtracting the cumulative size of available MAC PDUs arranged in the MAC layer packet with the predefined size of the MAC layer packet. A size of the unfiled portion may be equal to or less than a size of the MAC layer packet.

In step 408, a first byte is set in the unfilled portion of the MAC layer packet to a first fixed pattern that is selected from a predefined pattern set. In an exemplary embodiment, the predefined pattern set is a group of hexadecimal numbers. In an exemplary embodiment, the predefined pattern set includes 0x00, 0x10, 0x20, 0x30, 0x40, 0x50, 0x60, 0x70, 0x80, 0x90, 0xA0, 0xB0, 0xC0, 0xD0, 0xE0, and 0xF0. In an exemplary embodiment, the first fixed pattern that is selected from the predefined pattern set may be predefined in the system and/or negotiated prior to the communication.

The first byte in the unfilled portion is selected from the predefined pattern set. In an exemplary embodiment, the first byte is 0XF0. In step 410, the method 400 sets remaining bytes other than the first byte in the unfilled portion of the MAC layer packet to a second fixed pattern selected from the predefined pattern set. In an exemplary embodiment, each of the remaining bytes, other than first byte in the unfilled portion in the MAC layer packet, is set to a value 0x00. In an exemplary embodiment, the second fixed pattern from the predefined pattern set may be predefined in the system and/or pre negotiated prior to the communication. Thereafter, the process is terminated.

Figure 5:
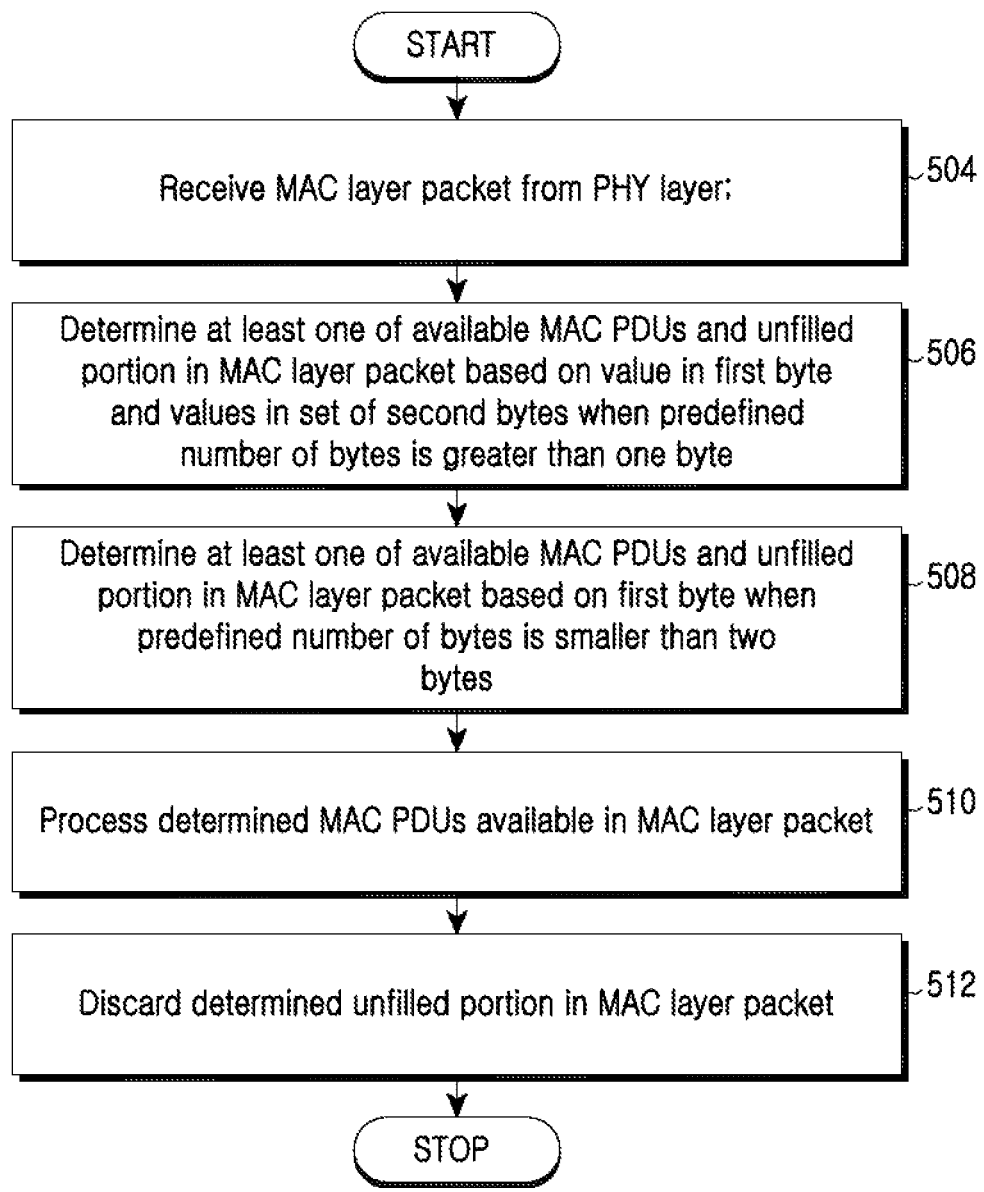
FIG. 5 illustrates a flow diagram for decoding a MAC layer packet according to an exemplary embodiment of the present invention.

FIG. 5 illustrates a flow diagram for decoding a MAC layer packet according to an exemplary embodiment of the present invention.

Referring to FIG. 5, in step 504, a MAC layer packet is received from a PHY layer. In step 506, the method 500 determines at least one of an available MAC PDU and an unfilled portion in the MAC layer packet based on a value in a first byte and values in a set of second bytes when the predefined number of bytes is greater than one byte. Here, the first byte may be associated with a first fixed pattern from a predefined pattern set and the set of second bytes may be associated with a second fixed pattern from the predefined pattern set. In an exemplary embodiment, the predefined number of bytes includes one or more bytes that are remaining for decoding in the MAC layer packet. That is, the predefined number of bytes is the number of remaining bytes to be decoded in the MAC layer packet.

In step 508 at least one of the available MAC PDU and/or the unfilled portion in the MAC layer packet is determined based on the first byte when the predefined number of bytes is smaller than two bytes. In an exemplary embodiment, information of the first fixed pattern associated with the first byte and information of the second fixed pattern associated with the set of second bytes is received at a receiving communication device prior to receiving the MAC layer packet information. In an exemplary embodiment, the information associated with the first byte and the set of second bytes is predefined and is stored in the MAC layer prior to receiving MAC layer packet information.

In an exemplary embodiment, the pattern set is a set of predefined numbers identified prior to establishing communication. In an exemplary embodiment, the pattern set is hexadecimal number 0x00, 0x10, 0x20, 0x30, 0x40, 0x50, 0x60, 0x70, 0x80, 0x90, 0xA0, 0xB0, 0xC0, 0xD0, 0xE0, and 0xF0. The first fixed pattern and the second fixed pattern are selected from the pattern set. In an exemplary embodiment, the first fixed pattern is a 0xF0 pattern and the second fixed pattern is a 0x00 pattern. In an exemplary embodiment, the first byte is a byte that is subsequent to a last byte that contains information associated with the available MAC PDUs in the predefined number of bytes. Thus, the set of second bytes are bytes that are subsequent to the first byte.

In an exemplary embodiment, the first byte is the last byte in the MAC layer packet. In an embodiment, the first byte is the first byte in the MAC layer packet. The size of the set of second bytes is determined based on the size of a MAC header. In step 510, the determined MAC PDUs in the MAC layer packet are processed. In step 512, the determined unfilled portion in the MAC layer packet is discarded. Thereafter, the process is terminated.

Figure 6:
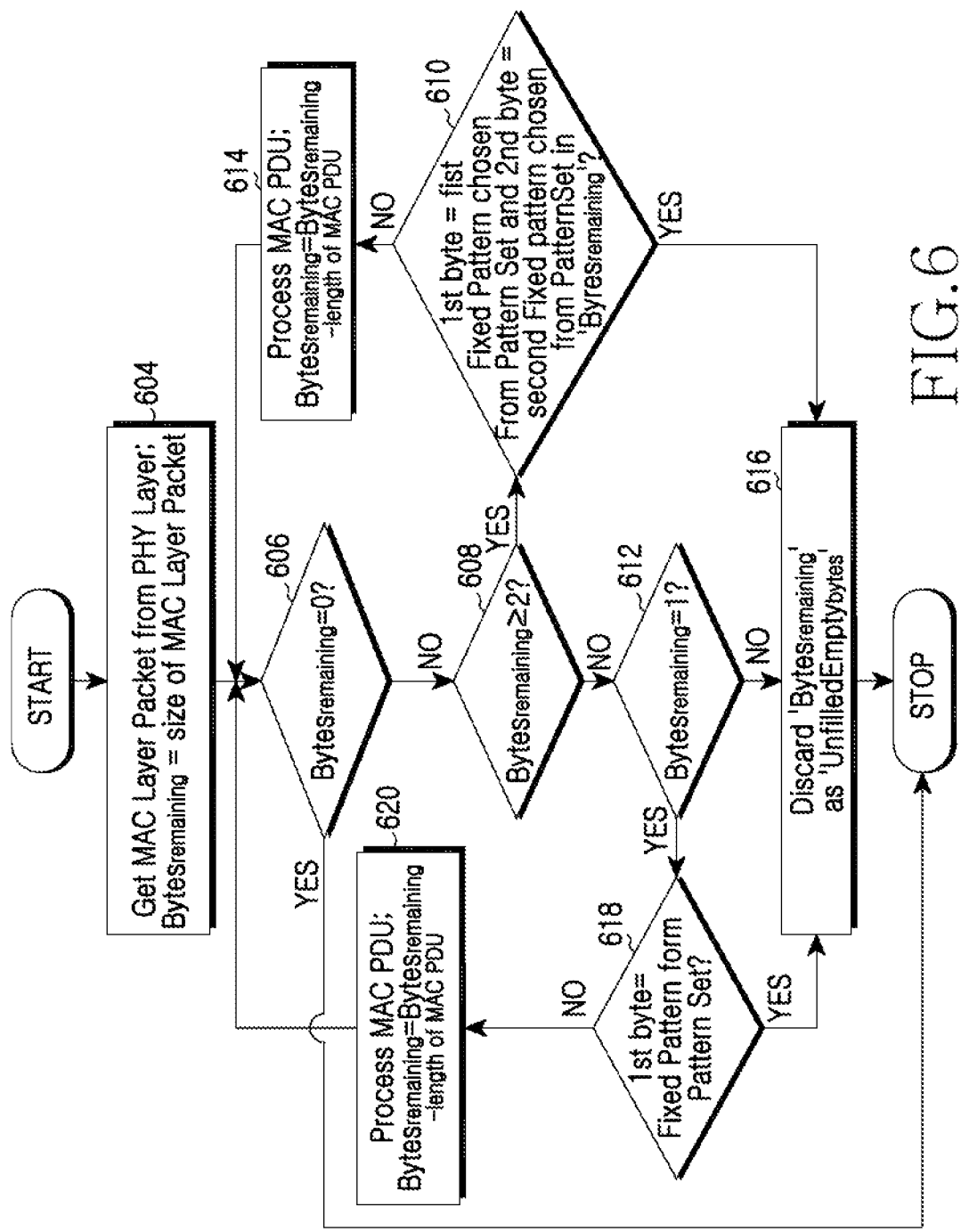
FIG. 6 illustrates a flow diagram for decoding a MAC layer packet according to an exemplary embodiment of the present invention.

FIG. 6 illustrates a flow diagram for decoding a MAC layer packet according to an exemplary embodiment of the present invention.

Referring to FIG. 6, in step 604 a MAC layer packet from the PHY layer is received and bytes that are remaining (Bytesremaining) are set to the size of MAC layer packet. In step 606, it is determined if 'Bytesremaining' is equal to zero. If it is determined that 'Bytesremaining' is equal to zero, the process is terminated. In contrast, if it is determined that 'Bytesremaining' is not equal to zero, step 608 is performed. In step 608, it is determined if 'Bytesremaining' is greater than or equal to the value two. If it is determined that 'Bytesremaining' is greater than or equal to the value two, step 610 is performed. In contrast, if it is determined that 'Bytesremaining' is not greater than or equal to the value two, step 612 is performed. Step 612 is described further below.

In step 610, it is determined if the first byte belongs to a fixed pattern in a pattern set and if the second byte belongs to a second fixed pattern in the pattern set. If the first byte does not belongs to the fixed pattern in the pattern set and/or the second byte does not belongs to the fixed pattern in the pattern set, step 614 is performed. For example, if the 'Bytesremaining' is greater than or equal to two and the first byte does not belong to the fixed pattern in the pattern set and/or the second byte is not from the fixed pattern from the pattern set, then the MAC PDU is processed in step 614. In step 614 the MAC PDU is processed and 'Bytesremaining' is set to a new value, that is 'Bytesremaining'='Bytesremaining'−Length of the MAC PDUs. Thereafter, the process returns to step 606.

Returning to step 610, if the first byte belongs to the fixed pattern in the pattern set and the second byte belongs to the fixed pattern in the pattern set, step 616 is performed. In step 616, 'Bytesremaining' is discarded in the MAC layer packet as unfilled empty bytes (UnfilledEmptyBytes). In an exemplary embodiment, if 'Bytesremaining' is greater than or equal to two and the first byte equals '0xF0' and second byte equals '0x00', then 'Bytesremaining' is discarded in the MAC Layer Packet as UnfilledEmptyBytes.

In step 612, it is determined if 'Bytesremaining' is equal to a value of one (i.e., One byte). If it is determined that 'Bytesremaining' is not equal to one, step 616 is performed. In contrast, if it is determined that 'Bytesremaining' is equal to one, step 618 is performed. In step 618 it is determined if the 1st byte belongs to one of the fixed patterns from the pattern set. If it is determined that the first byte belongs to the fixed pattern in the pattern set, step 616 is performed. In contrast, if it is determined that the byte does not belong to the fixed pattern in the pattern set, step 620 is performed. In step 620, the MAC PDU is processed and 'Bytesremaining' is set to a new value, that is 'Bytesremaining'='Bytesremaining'−Length of the MAC PDU. Thereafter, the process returns to step 606. In an exemplary embodiment, the fixed pattern from the pattern set is equal to '0xF0'.

Figure 7:
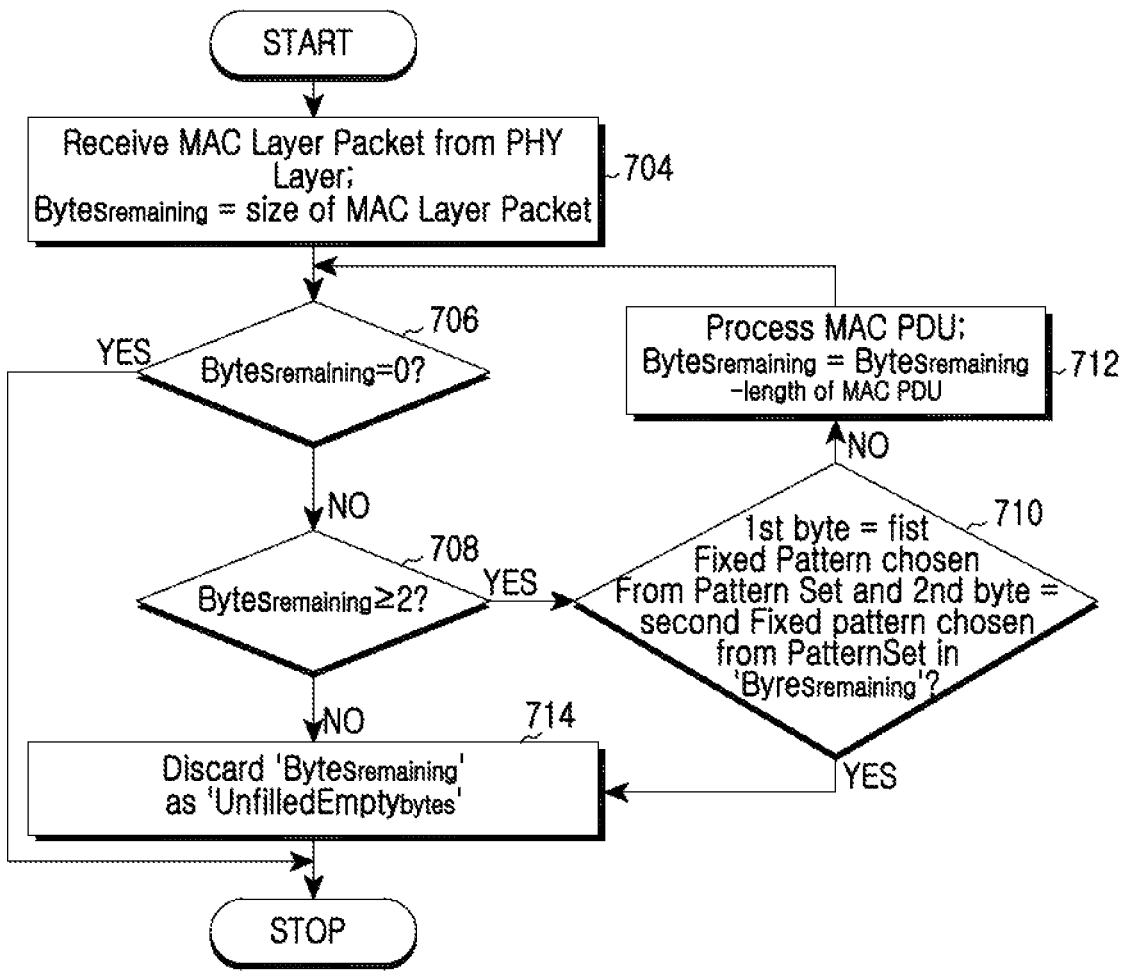
FIG. 7 illustrates a flow diagram for decoding a MAC layer packet according to an exemplary embodiment of the present invention.

FIG. 7 illustrates a flow diagram for decoding a MAC layer packet according to an exemplary embodiment of the present invention.

Referring to FIG. 7, in step 704, a MAC layer packet is received from the PHY layer and then bytes that are remaining (Bytesremaining) are set to a size of the MAC layer packet. In step 706, it is determined if 'Bytesremaining' is equal to zero. If it is determined that 'Bytesremaining' is equal to zero, the process is terminated. In contrast, if 'Bytesremaining' is not equal to zero, step 708 is performed. In step 708, it is determined if 'Bytesremaining' is greater than or equal to two. If it is determined that 'Bytesremaining' is greater than or equal to two, step 710 is performed. In contrast, it is determined that 'Bytesremaining' is not greater than or equal to two, step 714 is performed. Step 714 is described further below.

In step 710, it is determined if a first byte belongs to a fixed pattern in a pattern set and/or if a second byte belongs to a second fixed pattern in the pattern set. If the first byte does not belongs to the fixed pattern in the pattern set and/or the second byte does not belongs to the fixed pattern in the pattern set, step 712 is performed. For example, if 'Bytesremaining' is greater than or equal to two and the first byte does not belong to the fixed pattern in the pattern set and/or the second byte does not belong to the fixed pattern from the pattern set, then the MAC PDU is processed in step 712. In step 712 the MAC PDU is processed and the 'Bytesremaining' is set to a new value, that is 'Bytesremaining'='Bytesremaining'−Length of the MAC PDU. Thereafter, the process returns to step 706.

Returning to step 710, if it is determined that the first byte belongs to the fixed pattern in the pattern set and the second byte belongs to the fixed pattern in the pattern set, step 714 is performed. In step 714, 'Bytesremaining' in the MAC layer packet is discarded as unfilled empty bytes (UnfilledEmpty- Bytes). In an exemplary embodiment, if 'Bytesremaining' is greater than or equal to two, the first byte equals '0xF0', and second byte equals '0x00', then 'Bytesremaining' in the MAC Layer Packet is discarded as UnfilledEmptyBytes. After step 714, the process is terminated.

The decoding of a MAC layer packet having MAC headers of multiple sizes is described below with reference to FIG. 8.

Figure 8:
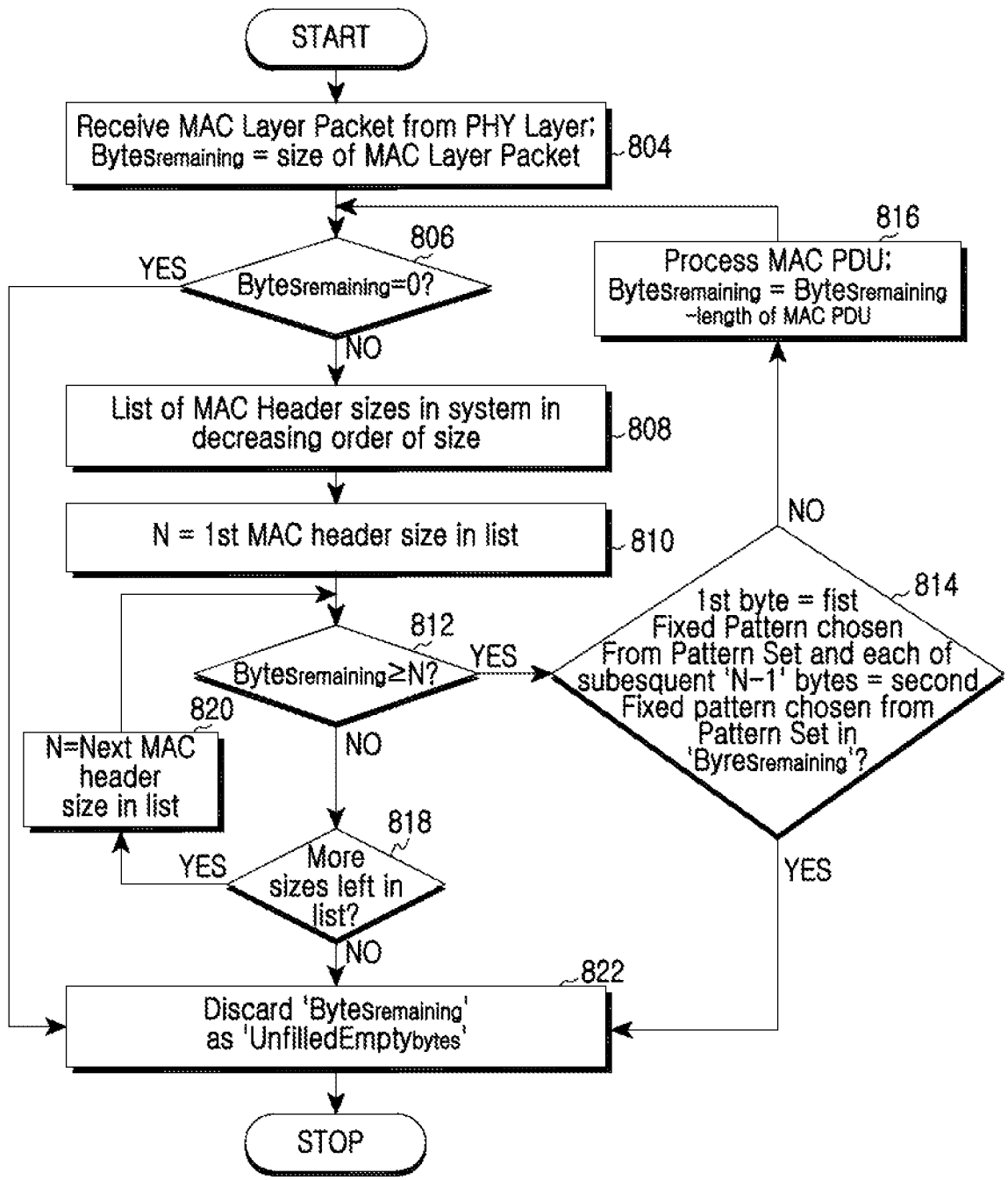
FIG. 8 illustrates a flow diagram for decoding a MAC layer packet according to an exemplary embodiment of the present invention.

FIG. 8 illustrates a flow diagram for decoding a MAC layer packet according to an exemplary embodiment of the present invention.

Referring to FIG. 8, in step 804, a MAC layer packet is received from the PHY layer and the number of bytes remaining ('Bytesremaining') is initially set to a size of the MAC layer packet. In step 806, it is determined if 'Bytesremaining' is equal to a value zero. If it is determined that 'Bytesremaining' is equal to the value zero, the process is terminated.

In contrast, if it is determined that 'Bytesremaining' is not equal to the value zero, step 806 is performed. In step 806, a list of MAC header sizes is prepared in a decreasing order of the MAC header sizes. In step 810, the first MAC header size in the list is stored in the variable 'N'. In step 812, it is determined if 'Bytesremaining' is greater than or equal to the value of the variable 'N'. If it is determined that the 'Bytesremaining' is greater than or equal to the value of the variable 'N', step 814 is performed. In contrast, if it is determined that 'Bytesremaining' is not greater than or equal to the value of the variable 'N', step 818 is performed. Step 818 is described further below.

In step 814, it is determined if a first byte of the remaining bytes to be decoded in the MAC layer packet belong to a fixed pattern in a pattern set and the subsequent 'N-1' bytes are equal to the fixed pattern in the pattern set. If it is determined that the first byte of the remaining bytes to be decoded in the MAC layer packet belong to the fixed pattern in a pattern set and the subsequent 'N-1' bytes are equal to the fixed pattern in the pattern set, step 822 is performed. In contrast, if it is determined that the first byte of the remaining bytes to be decoded in the MAC layer packet does not belong to the fixed pattern in a pattern set and/or the subsequent 'N-1' bytes are not equal to the fixed pattern in the pattern set, step 816 is performed.

In step 822, 'Bytesremaining' in the MAC layer packet is discarded as unfilled empty bytes (UnfilledEmptyBytes). In an exemplary embodiment, if 'Bytesremaining' is greater than or equal to 'N', the first byte equals '0xF0', if 'N' is greater than 1, and each of the subsequent 'N-1' bytes are equal to '0x00', 'Bytesremaining' in the MAC layer packet are discarded as unfilled empty bytes. In step 816, the MAC PDU is processed and a new value of 'Bytesremaining' is determined based on the length of the MAC PDU, that is 'Bytesremaining'='Bytesremaining'–length of MAC PDU. Thereafter step 816, the process returns to step 806.

In step 818, it is determined if there are more MAC header sizes left in the list. If it is determined that there are more MAC header sizes available, step 820 is preformed. In step 820, the variable 'N' value is set to the next MAC header size in the list. Thereafter the process returns to step 812. In contrast, if there are no more sizes available in the list, step 822 is performed. Here, in step 822, 'Bytesremaining' is discarded as unfilled empty bytes. After step 822, the process is terminated.

FIGS. 9A to 9D illustrate an exemplary method for filling unfilled portion in the MAC layer packet according to an exemplary embodiment of the present invention.

Figure 9A:
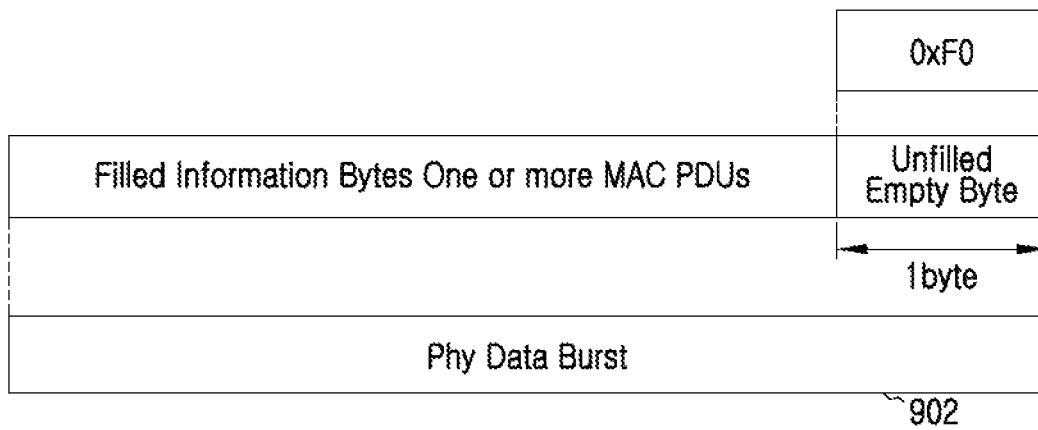
FIGS. 9A to 9D illustrate an exemplary method for filling unfilled portion in the MAC layer packet according to an exemplary embodiment of the present invention.

Referring to FIG. 9A, in section 902, one or more MAC PDUs are arranged in a MAC layer packet of a predefined size. Thereafter, the size of MAC layer packet is compared with the cumulative size of the arranged MAC PDUs to determine the number of bytes that are unfilled in the MAC layer packet after arranging the one or more MAC PDUs. Thereafter, the unfilled portion in the MAC layer packet is filled with a predefined pattern. In the section 902 it is determined that only one byte is unfilled after arranging the one or more MAC PDUs, hence the method fills the one byte with a value 0xF0 from the pattern set. In an exemplary embodiment, the pattern set includes the values 0x00, 0x10, 0x20, 0x30, 0x40, 0x50, 0x60, 0x70, 0x80, 0x90, 0xA0, 0xB0, 0xC0, 0xD0, 0xE0, and 0xF0.

Figure 9B:
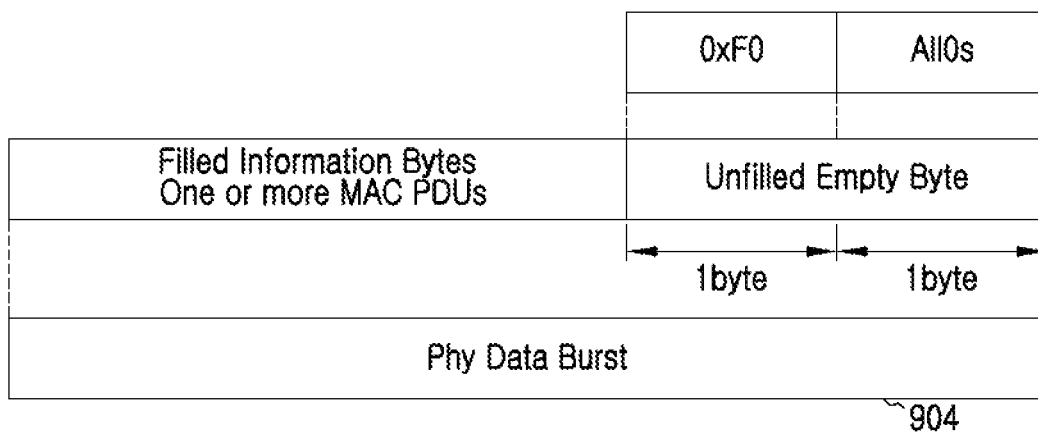
Figure 9C:
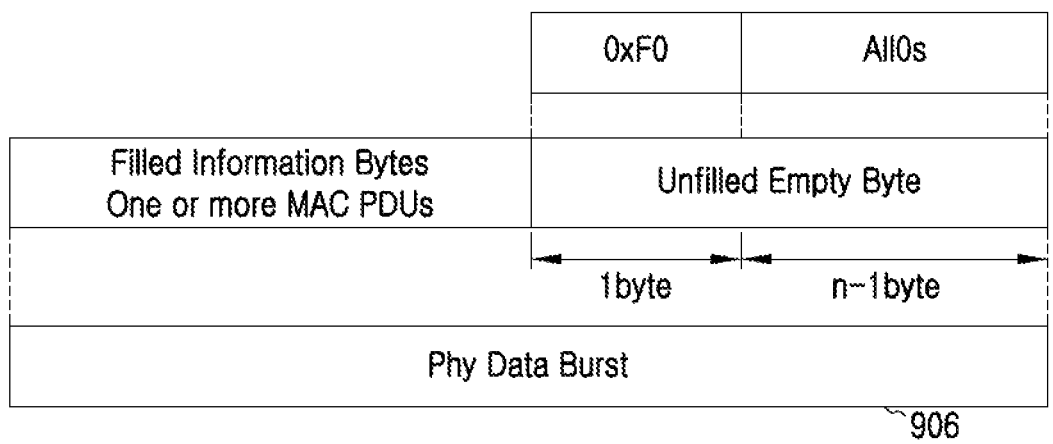

Referring to FIG. 9B, in section 904, it is determined that the unfilled portion in the MAC layer packet is two bytes. Then the method fills the first byte with the value 0xF0 and the second byte with the value 0x00. Similarly, referring to FIG. 9C, in section 906, it is determined that the unfilled portion in the MAC layer packet is more than two bytes, for example 'n' bytes. Then the first byte is filled with the value 0xF0 and the remaining bytes ('n-1') with values 0x00.

Figure 9D:
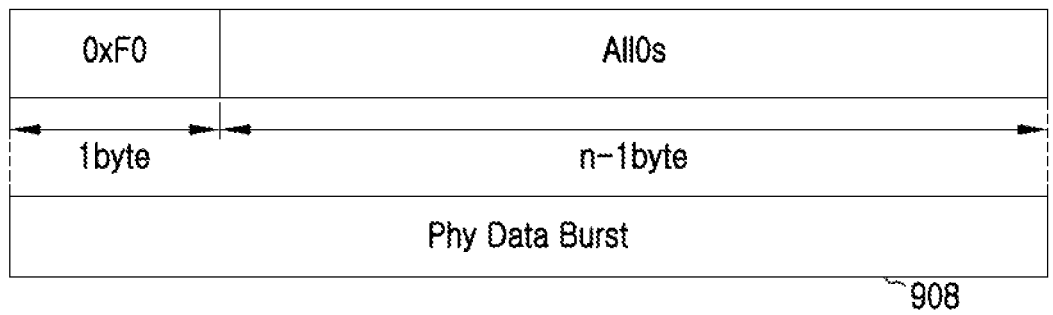

Referring to FIG. 9D, in section 908, no MAC PDU is arranged in a MAC layer packet of a predefined size. That is, unfilled empty bytes of the MAC layer packet are 'n'. The first byte with the value 0xF0 is filled and the second byte to n-th byte are filled with value 0x00. When the 'n' is equal to 1, a physical data burst is comprised of only '0xF0'. The MAC layer packet including the unfilled empty bytes is converted into the physical data burst and transmitted.

Figure 10:
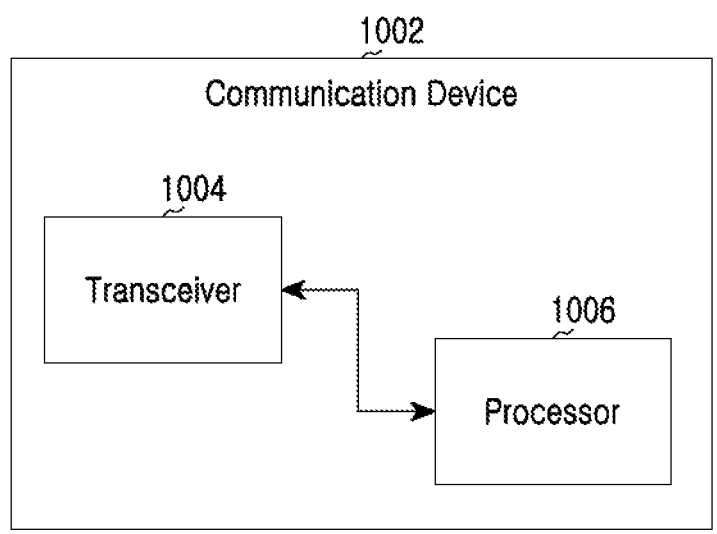
FIG. 10 illustrates a communication device according to an exemplary embodiment of the present invention.

FIG. 10 illustrates a communication device according to an exemplary embodiment of the present invention.

Referring to FIG. 10, the communication device 1002 includes a transceiver 1004 and a processor 1006. In accordance with an exemplary embodiment of the present invention, the transceiver 1004 transmits information associated with encoded MAC PDUs in a MAC layer packet. The transceiver 1004 is also capable of receiving information associated with encoded MAC PDUs in the MAC layer packet. The processor 1006 is capable of encoding available MAC PDUs information in the MAC layer packet. In an exemplary embodiment, the processor 1006 also decodes MAC PDUs from predefined byte information. In an exemplary embodiment, the processor 1006 determines unfilled bytes in the predefined byte information based on a first byte and a set of second bytes and discards the unfilled bytes in the predefined byte information.

Exemplary embodiments of the present invention provide methods to encode and decode MAC PDUs in/from a MAC layer packet. The exemplary methods first encode the MAC PDUs in a MAC layer packet and then the remaining unfilled portion in the MAC layer packet is filled with predefined information. Thus, when the MAC layer packet is decoded, a receiving device will identify exact locations of the empty bytes and the number of bytes that need to be discarded. This method prevents incorrect decoding of MAC layer packet at a receiving communication device in the absence of information to determine the exact location of empty bytes, thereby improving system efficiency.

The method uses a fixed pattern to indicate the location of empty bytes instead of reserving a flow identifier which is limited in numbers and this enables the system to support more connections for communication devices, and further improves user experience. This method further reduces processing time of the MAC layer packet at the MAC layer and thereby increases efficiency of the system.

In the present disclosure and advantages have been described with reference to exemplary embodiments of the present invention. However, it will be apparent to a person of ordinary skill in the art that various modifications and changes can be made, without departing from the scope of the present disclosure, as set forth in the claims and their equivalents. Accordingly, the contents of the disclosure are to be regarded as illustrative examples of the present disclosure, rather than in a restrictive sense. All such possible modifications are intended to be included within the scope of present disclosure.

Exemplary embodiments of the present invention are related to the use of a computer system for implementing the techniques described herein. In accordance with an exemplary embodiment of the present invention, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In accordance with an exemplary embodiment of the present invention, which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In accordance with an exemplary embodiment of the present invention, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for encoding Medium Access Control (MAC) Protocol Data Units (PDUs) in a MAC layer packet of predefined size comprising a predefined number of bytes in a Physical (PHY) data burst, the method comprising:
   identifying an unfilled portion of the MAC layer packet not including at least one MAC PDU;
   filling a first byte of the unfilled portion with a first fixed pattern, wherein the first fixed pattern is one of 0x10, 0x20, 0x30, 0x40, 0x50, 0x60, 0x70, 0x80, 0x90, 0xA0, 0xB0, 0xC0, 0xD0, 0xE0, and 0xF0; and
   if there is at least one remaining byte other than the first byte in the unfilled portion, filling the at least one remaining byte of the unfilled portion with a second fixed pattern, wherein the second fixed pattern is 0x00,
   wherein the at least one MAC PDU comprises a MAC PDU header at a start of the at least one MAC PDU,
   wherein the header comprises a length field at a sixth bit to sixteenth bit, and
   wherein the first fixed pattern and, if used, the second fixed pattern indicate that the unfilled portion does not include the at least one MAC PDU.

2. The method of claim 1, wherein a size of the unfilled portion is equal to or less than a size of the MAC layer packet.

3. The method of claim 1, wherein the first fixed pattern and the second fixed pattern are predefined in a first communication device.

4. The method of claim 1, wherein the first fixed pattern and the second fixed pattern are prenegotiated between a first communication device and a second communication device.

5. A method for decoding Medium Access Control (MAC) Protocol Data Units (PDUs) in a MAC layer packet of predefined size comprising a predefined number of bytes in a Physical (PHY) data burst, the method comprising:
   receiving the MAC layer packet;
   determining an unfilled portion of the MAC layer packet not including at least one MAC PDU based on a value in a first byte and values in a set of second bytes in the MAC layer packet when remaining bytes to be decoded in the MAC layer packet are greater than one byte, wherein the first byte is associated with a first fixed pattern and the set of second bytes is associated with a second fixed pattern; and
   determining the unfilled portion in the data burst based on the first byte when the remaining bytes to be decoded in the data burst are smaller than two bytes,
   wherein the first fixed pattern is one of 0x10, 0x20, 0x30, 0x40, 0x50, 0x60, 0x70, 0x80, 0x90, 0xA0, 0xB0, 0xC0, 0xD0, 0xE0, and 0xF0,
   wherein the second fixed pattern is 0x00,
   wherein the at least one MAC PDU comprises a MAC PDU header at a start of the at least one MAC PDU,
   wherein the header comprises a length field at a sixth bit to sixteenth bit, and
   wherein the first fixed pattern and, if used, the second fixed pattern indicate that the unfilled portion does not include the at least one MAC PDU.

6. The method of claim 5, further comprising discarding the determined unfilled portion.

7. The method of claim 5, further comprising receiving information of the first fixed pattern associated with the first byte and the second fixed pattern associated with the set of second bytes prior to receiving the data burst information.

8. The method of claim 5, wherein the first fixed pattern associated with the first byte and the second fixed pattern associated with the set of second bytes are predefined and are stored in a MAC layer prior to receiving data burst information.

9. The method of claim 5, wherein a size of the unfiled portion is equal to or less than a size of the data burst.

10. The method of claim 5, wherein the first byte is a byte that is subsequent to a last byte that contains information associated with the at least one MAC PDU in the predefined number of bytes.

11. The method of claim 10, wherein the set of second bytes are bytes that are subsequent to the first byte.

12. The method of claim 5, wherein the first byte is a last byte in the data burst.

13. The method of claim 5, wherein the first byte is the first byte in the data burst.

14. The method of claim 5, wherein a size of the set of second bytes is determined based on a size of the MAC PDU header.

15. An apparatus for encoding Medium Access Control (MAC) Protocol Data Units (PDUs) in a MAC layer packet of predefined size comprising a predefined number of bytes in a Physical (PHY) data burst, the apparatus comprising:
- a processor for identifying an unfilled portion of the MAC layer packet not including at least one MAC PDU, for filling a first byte of the unfilled portion with a first fixed pattern, wherein the first fixed pattern is one of 0x10, 0x20, 0x30, 0x40, 0x50, 0x60, 0x70, 0x80, 0x90, 0xA0, 0xB0, 0xC0, 0xD0, 0xE0, and 0xF0, and if there is at least one remaining bytes other than the first byte in the unfilled portion, for filling the at least one remaining bytes of the unfilled portion with a second fixed pattern, wherein the second fixed pattern is 0x00; and
- a transceiver for transmitting the PHY data burst comprising the MAC layer packet,
- wherein the at least one MAC PDU comprises a header at a start of the at least one MAC PDU,
- wherein the header comprises a length field at a sixth bit to sixteenth bit, and
- wherein the first fixed pattern and, if used, the second fixed pattern indicate that the unfilled portion does not include the at least one MAC PDU.

16. The apparatus of claim 15, wherein a size of the unfilled portion is equal to or less than a size of the MAC layer packet.

17. The apparatus of claim 15, wherein the first fixed pattern and the second fixed pattern are predefined in a first communication device.

18. The apparatus of claim 15, wherein the first fixed pattern and the second fixed pattern are prenegotiated between a first communication device and a second communication device.

19. An apparatus for decoding Medium Access Control (MAC) Protocol Data Units (PDUs) in a MAC layer packet of predefined size comprising a predefined number of bytes in a Physical (PHY) data burst, the apparatus comprising:
- a transceiver for receiving the MAC layer packet; and
- a processor for determining an unfilled portion of the MAC layer packet not including at least one MAC PDU in the MAC layer packet based on a value in a first byte and values in a set of second bytes when remaining bytes to be decoded in the MAC layer packet are greater than one byte, and determining the unfilled portion in the MAC layer packet based on the first byte when the remaining bytes to be decoded in the MAC layer packet are smaller than two bytes,
- wherein the first byte is associated with a first fixed pattern and the set of second bytes is associated with a second fixed pattern,
- wherein the first fixed pattern is one of 0x10, 0x20, 0x30, 0x40, 0x50, 0x60, 0x70, 0x80, 0x90, 0xA0, 0xB0, 0xC0, 0xD0, 0xE0, and 0xF0,
- wherein the second fixed pattern is 0x00,
- wherein the at least one MAC PDU comprises a MAC PDU header at a start of the at least one MAC PDU,
- wherein the header comprises a length field at a sixth bit to sixteenth bit, and
- wherein the first fixed pattern and, if used, the second fixed pattern indicate that the unfilled portion does not include the at least one MAC PDU.

20. The apparatus of claim 19, wherein the processor discards the determined unfilled portion.

21. The apparatus of claim 19, wherein the transceiver receives information of the first fixed pattern associated with the first byte and the second fixed pattern associated with the set of second bytes prior to receiving the data burst.

22. The apparatus of claim 19, wherein the first fixed pattern associated with the first byte and the second fixed pattern associated with the set of second bytes are predefined and are stored in a MAC layer prior to receiving data burst information.

23. The apparatus of claim 19, wherein a size of the unfiled portion is equal to or less than a size of the data burst.

24. The apparatus of claim 19, wherein the first byte is a byte that is subsequent to a last byte that contains information associated with the at least one MAC PDU in the predefined number of bytes.

25. The apparatus of claim 24, wherein the set of second bytes are bytes that are subsequent to the first byte.

26. The apparatus of claim 19, wherein the first byte is a last byte in the data burst.

27. The apparatus of claim 19, wherein the first byte is the first byte in the data burst.

28. The apparatus of claim 19, wherein a size of the set of second bytes is determined based on a size of the MAC PDU header.

* * * * *